United States Patent
Dozier et al.

(10) Patent No.: US 7,942,375 B2
(45) Date of Patent: May 17, 2011

(54) MOUNT AND LEVELING SYSTEM

(75) Inventors: Leonard B. Dozier, Yorba Linda, CA (US); Michael F. Bouissiere, Yorba Linda, CA (US)

(73) Assignee: Premier Mounts, Anaheim, CA (US)

( * ) Notice: Subject to any disclaimer, the term of this patent is extended or adjusted under 35 U.S.C. 154(b) by 0 days.

(21) Appl. No.: 12/323,435

(22) Filed: Nov. 25, 2008

(65) Prior Publication Data

US 2009/0108150 A1 Apr. 30, 2009

Related U.S. Application Data (63) Continuation of application No. 11/317,585, filed on Dec. 23, 2005, now abandoned.

(51) Int. Cl.
*A47H 1/00* (2006.01)
*F16F 11/32* (2006.01)
(52) U.S. Cl. ............. 248/324; 248/589; 248/163.2; 248/434; 411/378; 411/395
(58) Field of Classification Search .......... 248/489, 248/495, 496, 317, 323, 324, 343, 163.2, 248/434, 589, 593, 917–919; 411/395, 504, 411/378, 401
See application file for complete search history.

(56) References Cited

U.S. PATENT DOCUMENTS

| | | | |
|---|---|---|---|
| 3,404,938 A * | 10/1968 | Kubnick et al. ............ 352/242 |
| 4,239,196 A | 12/1980 | Hanger | |
| 4,473,873 A | 9/1984 | Quiogue | |
| 4,533,127 A | 8/1985 | Hawkins | |
| 5,690,459 A * | 11/1997 | Donovan et al. ............ 411/504 |
| 6,491,293 B1 | 12/2002 | Brewer | |
| 6,708,940 B2 | 3/2004 | Ligertwood | |
| 6,811,365 B2 * | 11/2004 | Monson ................ 411/395 |
| 6,988,698 B2 | 1/2006 | O'Neill | |
| 7,029,133 B2 | 4/2006 | Challis | |
| D540,367 S | 4/2007 | Dittmer | |
| 7,503,536 B2 * | 3/2009 | Friederich et al. ........... 248/324 |
| 7,758,001 B2 * | 7/2010 | Bouissiere ............. 248/206.5 |
| 2004/0211872 A1 | 10/2004 | Dittmer et al. | |
| 2005/0139742 A1 | 6/2005 | Frisell | |
| 2006/0186301 A1* | 8/2006 | Dozier et al. ............. 248/371 |
| 2008/0061200 A1* | 3/2008 | Bouissiere ............. 248/206.5 |
| 2009/0108150 A1* | 4/2009 | Dozier et al. ............. 248/205.1 |

FOREIGN PATENT DOCUMENTS

| | | |
|---|---|---|
| DE | 10044213 | 4/2002 |
| EP | 332762 | 9/1989 |
| WO | WO03067142 | 8/2003 |

* cited by examiner

*Primary Examiner* — Tan Le
(74) *Attorney, Agent, or Firm* — Altera Law Group, LLC (57) ABSTRACT

The present invention involves a projector mount and leveling system for securely connecting and aligning a working unit, such as a projector, to the ceiling of a room. The present invention has a ceiling component with upper and lower sections, the upper section of the ceiling component attaches to a mounting surface, typically the mounting surface is a ceiling, a mounting bracket connects to the lower section of the ceiling component; a plurality of offset articulated legs, each offset articulated leg having a proximal end, and a distal end with a threaded leveling barrel opening; and threaded leveling barrels, wherein the offset articulated legs connect to the mounting bracket at the proximal end, and the offset articulated legs connect at the distal ends to a projector with the threaded leveling barrels.

5 Claims, 13 Drawing Sheets

MOUNT AND LEVELING SYSTEM

CROSS-REFERENCE TO RELATED APPLICATIONS

This application is a continuation of application Ser. No. 11/317,585, filed on 23 Dec. 2005 now abandoned. The application is incorporated herein by reference.

STATEMENT REGARDING FEDERALLY SPONSORED RESEARCH OR DEVELOPMENT

Not Applicable

BACKGROUND OF THE INVENTION

1. Field of the Invention

This invention relates to a mounting system for attaching equipment such as audio/visual equipment, projectors, etc. to a fixed support for a potentially heavy unit. Typically, it is concerned with a mounting unit whereby, for example, a projector can be readily mounted to a ceiling, floor or wall, and function in a required way with a pre-determined alignment on a variety of different projector models. While a typical heavy unit is a video or data projector, the invention is not limited to a mounting unit for such a projector.

2. Background

For the purposes of projecting a video recording or data, there are advantages to having a projector mounted well above the head height of a standing viewer. Typically in a hotel, conference center or viewing room a mounting bracket at a relatively high locations provides for a projector attached to it to display on a screen without the projected image being interrupted by the passage of a late arrival. However the provision of a high mounting bracket can cause access and alignment problems when a projector is mounted by means of a single bracket. In addition, a proper alignment system should allow for the ready alignment of an attached projector. The system should also provide for ready mounting and dismounting of the projector when the projector is not used for a period of time. This permits the projector to be readily removed from the mounting system, and stored in a secure environment. It also provides for easy off site maintenance.

Another problem in equipment installation to a mounting point is that various forms and brands of equipment having a unpredictably spaced mounting anchor points thereon, it is necessary to be able to adjust for the unpredictability.

There are two basic methods for installing a projector. The first method is a shelf mount. The shelf mount suspends a shell on which the projector sits from the ceiling. In this method, a user places the projector on the ceiling, and provides easy access to remove or replace the projector (just unhook cables and lift the unit out of the shelf). This method is necessary for projectors without mounting connectors or models that can't invert their signal. However, this method is bulky requiring more space, more installation time, and provides a less professional look than the preferred column mount method.

The second method uses a plate or column mount to secure the projector. In this method, the mounting hardware attaches to secure points in the ceiling and to mounting holes underneath the projector chassis. The typical process for installing column or plate mounts is similar: connect the mounting hardware to the ceiling; connect the projector to a bracket, except in one-piece mounts where the mounting hardware and bracket are a single unit, and then connect the bracket to the ceiling mount. The projector can then be suspended upside down, and the control buttons of the projector are accessible from beneath by connecting the ceiling hardware with the bracket on the projector.

Many projector manufacturers recommend using a manufacturer-specific mounting kit for installation of the projector on the ceiling. However, a major disadvantage of using the manufacturer-specific mounting kit is that the user cannot readily interchange the projector with different manufacturer models of projectors, and stocking so may parts becomes prohibitive. If a user has more than one projector, or wants to replace or add a different model projector as a backup or in another location, the manufacturer specific mounting kits can be inconvenient and more expensive.

In response to a need for interchangeability for a variety of projectors, several manufacturers now offer units or systems that can be compatible with a variety of projectors. These systems typically use brackets with fixed arms or pins or require additional components to change projectors. A problem with fixed arm mounting systems is that the units must align perfectly with the projector. This feature limits the range of motion for securing a projector, and eliminates certain projectors that cannot align with the unit. A problem with using additional model specific parts, depending on the projector model, is the part must also be available and accessible for the user to reinstall the projector.

U.S. Pat. No. 6,708,940 to Ligertwood, hereby incorporated by reference hereto, is an example of a projector mount using a column system requiring additional model specific parts. The projector mount shown in the Ligertwood patent requires different mounting plates to mount different models of projectors. This system increases the number of projectors that can be mounted, however, it suffers from at least two problems.

The first problem is the user must have the complementary mounting plate for its particular model of projector to use the system. The need for model specific mounting plates means additional cost depending on the number of projector models that need to be accommodated by the projector mount. For each different or new model projector, a new mounting plate can be required to use the mounting system. When more than one model of projector is in use, this can be expensive and inconvenient.

A second problem is many users require the mounting system provide easy and quick interchangeability with different projectors. In a typical meeting or presentation setting, when a projector malfunctions, the user is under time pressure to complete the presentation. If a second functional projector is available, and is the same or similar projector, then the user can complete the change. However, if not, then the user must locate and reinstall a complementary mount (assuming one is available) to secure the projector. The can be a major problem. At the least, this can cause serious inconvenience for the user.

Accordingly a need exists for an economical projector mount that can easily secure a variety of different projectors without using separate mounting plates or other additional equipment. This projector mount system should also facilitate the exchange of different projectors using the same basic equipment, and at the same time be able to effectively secure and align the projector.

BRIEF SUMMARY

To assist the reader in preparing to digest the detailed description and claims below, a short summary has been provided. It is far from complete and only provides a glimpse of the invention concepts. It is not intended to define the scope of the invention. The claims perform that function.

The present invention satisfies those needs. The present invention has a mounting unit for securely connecting and aligning a working unit, such as a projector, to the ceiling of a room, and provides an easy exchange of the same and different projector models. The present invention is a mounting and leveling system connecting the projector to a mounting surface such as a ceiling or a wall.

An embodiment of the present invention includes: a ceiling component with upper and lower sections, the upper section of the ceiling component attaches to the mounting surface; a mounting bracket connects to the lower section of the ceiling component; a plurality of jointed articulated legs, each jointed articulated leg having a proximal end, and a distal end having a threaded leveling barrel opening, the proximal end of the jointed articulated legs connects to the mounting bracket; a plurality of threaded leveling barrels having a top orifice, a bottom orifice, and a hollow center orifice, the threaded leveling barrel threads into the threaded leveling barrel opening of the jointed articulated legs; a screw having a screw head sized to fit inside the hollow center orifice of the threaded leveling barrels, and the screw inside the hollow center orifice connects the threaded leveling barrels to the projector.

A ceiling component can be attached to a mounting surface such as a ceiling, a vertical surface such as a wall, and even to an angled surface, and the term is not intended to be limited to ceilings. A ceiling component can include a ceiling assembly having upper and lower sections, and an extendable and retractable middle (or column) section; or a ceiling assembly having upper and lower sections but lacking an extendable and retractable middle (or column) section.

An embodiment of the invention has: a ceiling component having upper and lower sections; the upper section of the ceiling component attaches to the mounting surface; a mounting bracket having top and bottom portions; the lower section of the ceiling assembly connects to the top portion of the mounting bracket; a plurality of offset articulated legs, each offset articulated leg having a proximal end and a distal end, the offset articulated legs connects at the proximal end to the mounting bracket, and connects at the distal ends to a projector.

Another embodiment of the invention has a ceiling assembly with upper and lower sections, the upper section of the ceiling assembly attaches to the ceiling of a room, a mounting bracket having top and bottom portions, the lower section of the ceiling assembly connects to the top portion of the mounting bracket; a plurality of offset articulated legs, each offset articulated leg having a proximal end and a distal end with a threaded leveling barrel opening; and threaded leveling barrels having a top orifice, a bottom orifice, side orifices, and a hollow center orifice, wherein the offset articulated legs connect to the mounting bracket at the proximal end, and the offset articulated legs connect at the distal ends to a projector with a screw head that fits inside the hollow center orifice of the threaded leveling barrels.

Another embodiment of the invention is a mounting bracket having top and bottom portions that connects to a lower section of a ceiling assembly, and a plurality of jointed articulated legs, each leg having a proximal end and a distal end with a threaded leveling barrel opening; and threaded leveling barrels, wherein the jointed articulated legs connect to the mounting bracket at the proximal end, and the jointed articulated legs connect at the distal ends to a projector with the threaded leveling barrels.

Another embodiment of the invention is a mounting bracket having top and bottom portions that connects to a lower section of a ceiling assembly, and a plurality of offset articulated legs, each offset articulated leg having a proximal end and a distal end with a threaded leveling barrel opening; and threaded leveling barrels having a top orifice, a bottom orifice, side orifices, and a hollow center orifice, wherein the articulated legs connect to the mounting bracket at the proximal end, and the articulated legs connect at the distal ends to a projector with a screw head that fits completely inside the hollow center orifice of the threaded leveling barrels.

An embodiment of the present invention also include a mounting and leveling kit for connecting a projector to a mounting surface. An embodiment of kit according to the invention includes: a ceiling component having upper and lower sections; the upper section of the ceiling component connects to the mounting surface; a mounting bracket having top and bottom portions; the lower section of the ceiling component connects to the top portion of the mounting bracket; a plurality of offset articulated legs, each offset articulated leg having a proximal end and a distal end with a threaded leveling barrel opening; threaded leveling barrels having a top orifice, a bottom orifice, and a hollow center orifice the threaded leveling barrels thread into the threaded leveling barrel openings of the offset articulated legs; a plurality of different size screws having screw heads with the same size and shape depression in each screw head, the screw heads sized to fit inside the hollow center orifice and snuggly against the bottom orifice of the threaded leveling barrels, at least one size screw from the plurality of screws securely connects the threaded leveling barrels to the projector.

As mentioned above, there are many more features and embodiments. Reference should be had now to the detailed description and claims which follow.

BRIEF DESCRIPTION OF THE SEVERAL VIEWS OF THE DRAWINGS

An exemplary embodiment of the invention will now be described with reference to the accompanying drawings of a mounting bracket for a projector of which.

DETAILED DESCRIPTION OF THE INVENTION

The following discussion describes embodiments of the invention and several variations of these embodiments. This discussion should not be constructed, however, as limiting the invention to these particular embodiments. Practitioners skilled in the art will recognize numerous other embodiments as well.

The mounting unit of the present invention preferably has jointed articulated legs with a range of motion enabling a user to adjust the legs to each projector's different layout. The jointed articulated legs can detach into at least two leg portions, such as a proximal leg and a distal leg. The jointed articulated legs can be connected to each other to be parallel or offset vertically at an angle around a pivot point. All of the drawings show the jointed articulated legs of the invention as offset articulated legs. However, a jointed articulated leg can be connected as substantially parallel in embodiments of the invention.

In a preferred embodiment, the jointed articulated legs are offset vertically (i.e. spaced apart in different planes by spacers or that each of ends are in different planes because the connection portion between the ends is offset from each end) so as to allow each leg 360° of rotation, and are referred to as offset articulated legs. The user connects the mounting bracket to the projector; installs the ceiling component on the ceiling; and then connects the two. A system of thumbscrews, pins, or notches can be used to connect the mounting bracket to the ceiling component, and that makes it easier to adjust or remove the projector. The user can also bolt or screw the two parts together. Either method is fine, as long as the mounting unit supports the projector's weight and the user carefully connects them to be secure.

Figure 1:
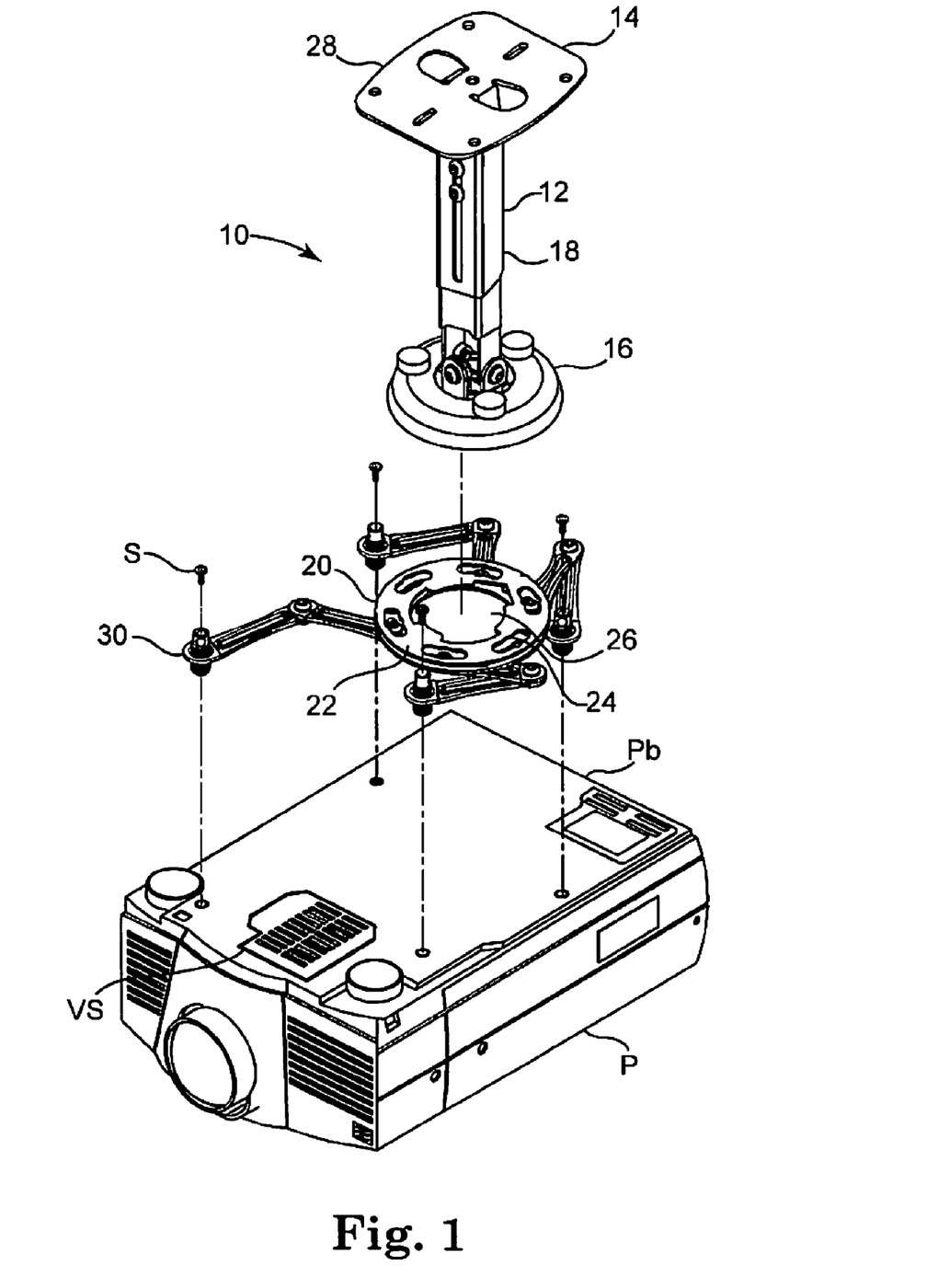
FIG. 1 is a perspective view showing the present invention in position for mounting a projector.

The figures show in whole or in part a mounting unit 10 for attaching a projector 1 (shown in FIG. 1) to a mounting surface which can be horizontal or at some angle intermediate the horizontal and vertical. FIG. 1 is a perspective view showing the present invention in position for mounting a projector. The mounting unit 10 includes: a ceiling mounting plate 28 on the upper section 14 of the ceiling assembly 12, whereby the unit can be attached to a mounting surface, such as a horizontal ceiling (not shown), in vertical (not shown), and at an angle (not shown). The middle section 18 of the ceiling assembly 12 can be constructed to pivot or move as necessary for mounting in horizontal, vertical, and at an angle positions.

An easy method for installation of a mounting bracket unit 10 of the present invention involves the following basic steps: securely attaching the upper section 14 of the ceiling assembly 12 to the mounting surface, such as a ceiling; securely connecting a bracket 20 with jointed articulated legs 30 and threaded leveling barrels 40 to a projector; and then securely connecting the mounting bracket 20 with the jointed articulated legs 30 holding the projector to the lower section of the mounting unit 10.

Figure 3:
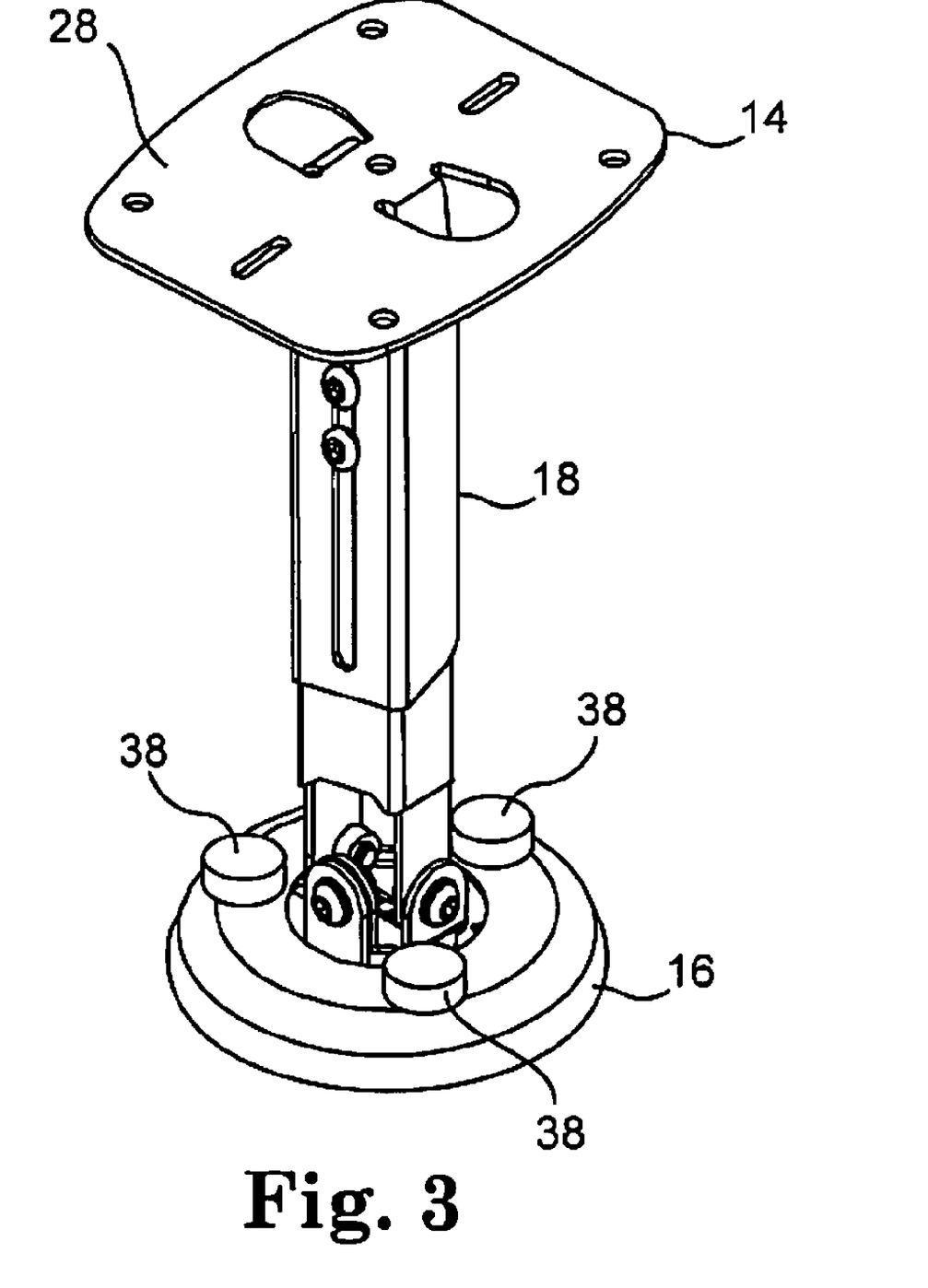
FIG. 3 is a perspective view of a ceiling assembly according to the present invention.
Figure 4:
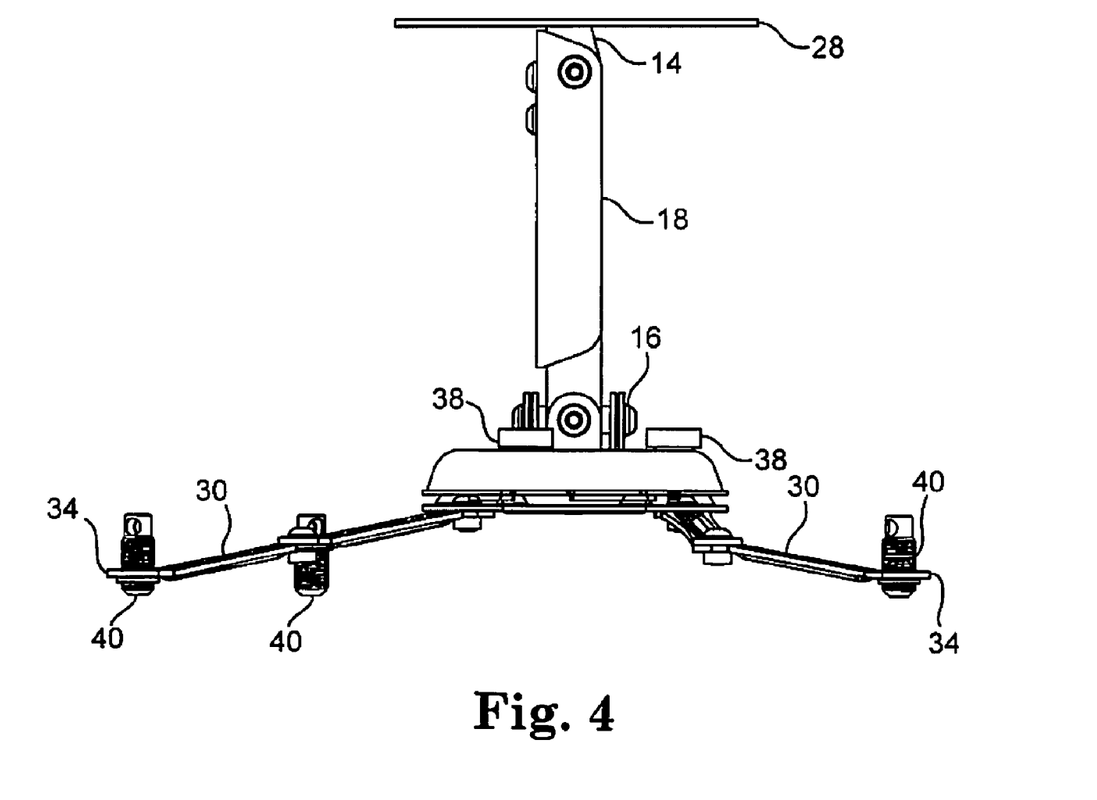
FIG. 4 is a side view of the ceiling assembly securely connected to the mounting bracket, and articulated legs of the present invention.
Figure 5:
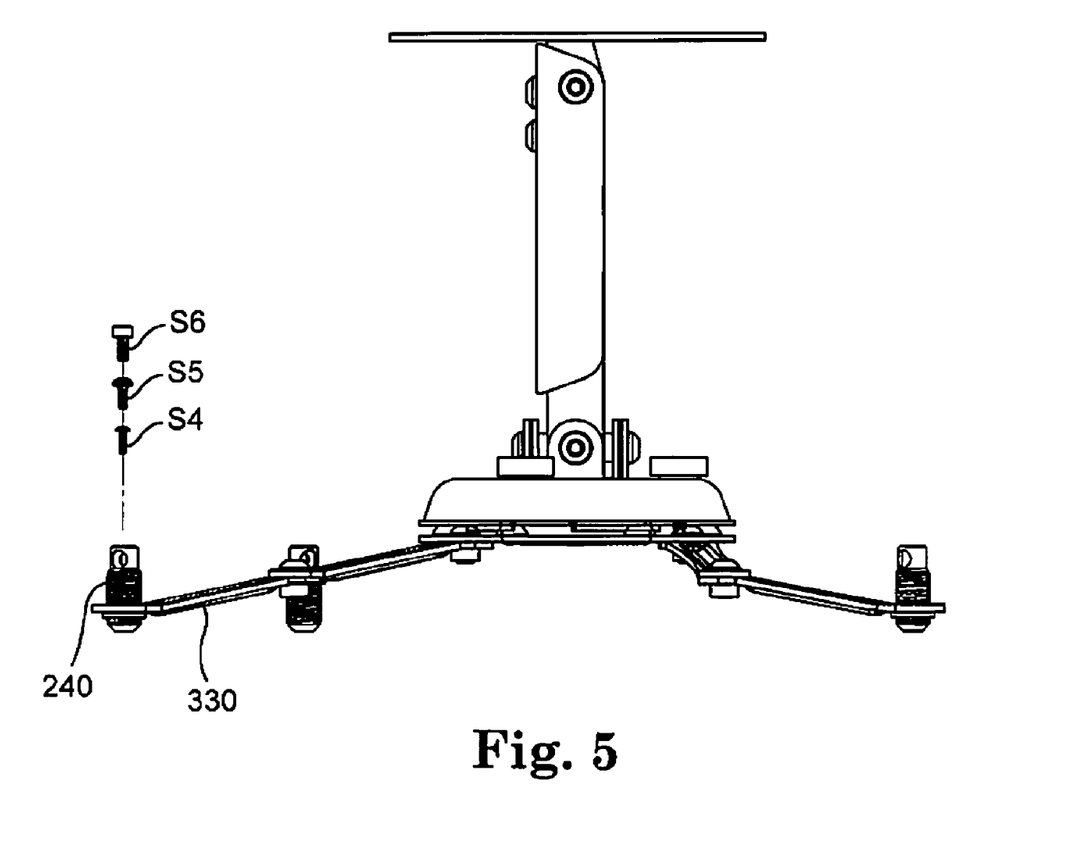
FIG. 5 is the side view shown from FIG. 4 with the addition of dimensions (shown in inches and (mm)) on the drawing.

FIG. 1, and FIG. 3-FIG. 5 show a ceiling assembly 12 having upper 14 and lower 16 sections, and an extendable and retractable middle (or column) section 18 as the ceiling component. FIG. 3 is a perspective view of a ceiling assembly 12 according to the present invention. FIG. 4 is a side view of the ceiling assembly 12 securely connected to the mounting bracket 20, and jointed articulated legs 30 of the present invention. FIG. 5 is a drawing of the embodiment of the invention shown in FIG. 4 except with dimensions described therein.

In FIG. 1, and FIGS. 3-5, the ceiling assembly 12 has an extendable and retractable middle section 18 that goes up or down. The upper section 14 of the ceiling assembly 12 attaches to a ceiling in this orientation. The lower section of the ceiling assembly 12 connects to a top portion 22 of a mounting bracket 20 having a top portion 22 and a bottom portion (not shown). The mounting bracket 20 connects to a plurality of jointed articulated legs 30. See FIG. 2, and FIGS. 4-6.

Figure 6:
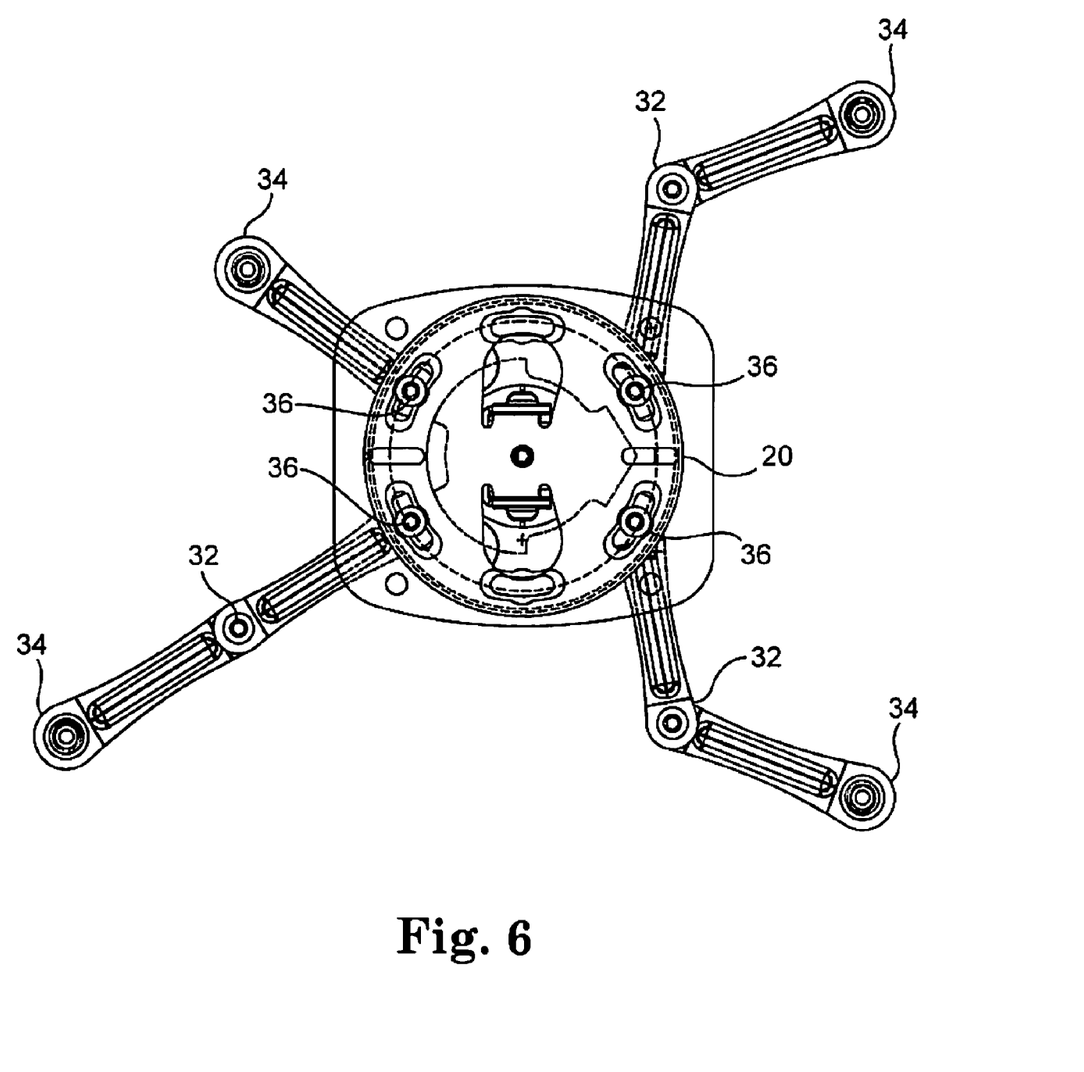
FIG. 6 is an exposed top plan view showing the upper section of the ceiling assembly attached to the top portion of the mounting bracket and the mounting bracket connected to a plurality of articulated legs.
Figure 7:
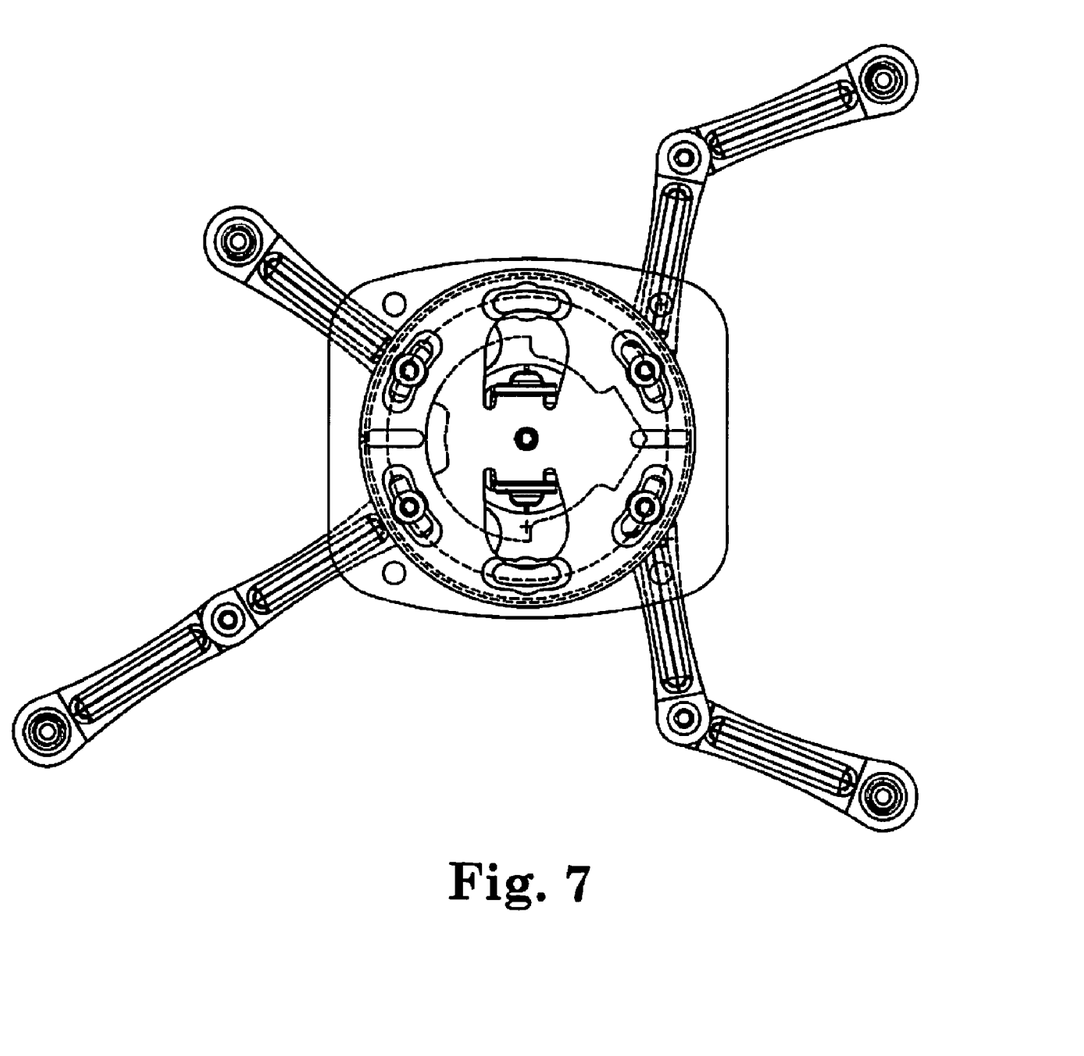
FIG. 7 is the bottom plan view from FIG. 6 with the addition of dimensions (shown in inches and (mm)) on the drawing.

FIG. 6 is an exposed top plan view showing the upper section 14 of the ceiling assembly 12 attached to the top portion 22 of the mounting bracket 20, and the mounting bracket 20 connected to a plurality of jointed articulated legs 30. FIG. 7 is a drawing of the embodiment of the invention shown in FIG. 6 with particular dimensions described therein.

In FIG. 1, the mounting bracket 20 has a female lock opening 26 that connects to a reciprocal male lock structure (not shown) located beneath the lower section of the ceiling assembly 12. Using this example, the user can easily secure the projector to the lower section 16 of the ceiling assembly 12 by mating the male lock structure (not shown). This locking configuration also permits the user to easily detach the projector with mounting bracket when necessary.

In this structure, the user loosens three knurl knobs 38 to expose fully the male lock structure (not shown) in the lower section 16 of the ceiling assembly 12. The user carefully lifts the projector and inserts the male tri-lock structure into the female lock opening 26 of the mounting bracket 20 to engage (or mate) the male lock structure in the female lock opening, and start the locking action. Once mated, the user then rotates the projector and mounting bracket about 180°, and tightens the three knurl knobs 38 until the mount becomes rigid. See FIG. 1.

In this embodiment, three knurl knobs are shown, however, other means of secure attachments are possible. Moreover, the number of knurl knobs is only limited by their ability to securely lock the structure holding the projector, and can include any number that accomplishes that function.

In this embodiment, the above male lock structure and female lock opening is an example of one of a variety of connections for connecting the mounting bracket with the projector to the lower section of a ceiling assembly. Other connections that can securely join the above components, and allow for detachability are within the scope of the present invention.

Figure 8:
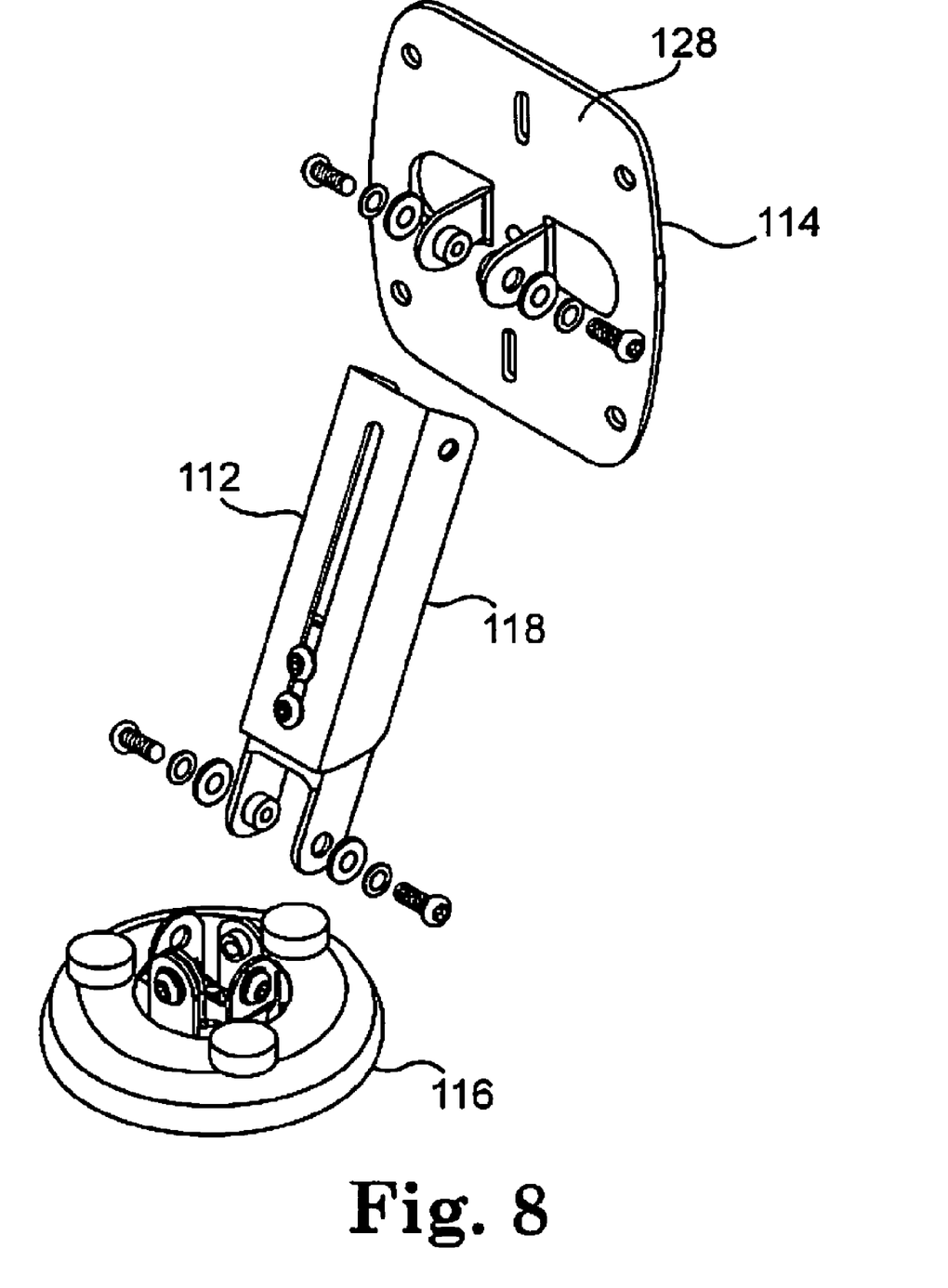
FIG. 8 is an exploded view of a ceiling/wall assembly.
Figure 9:
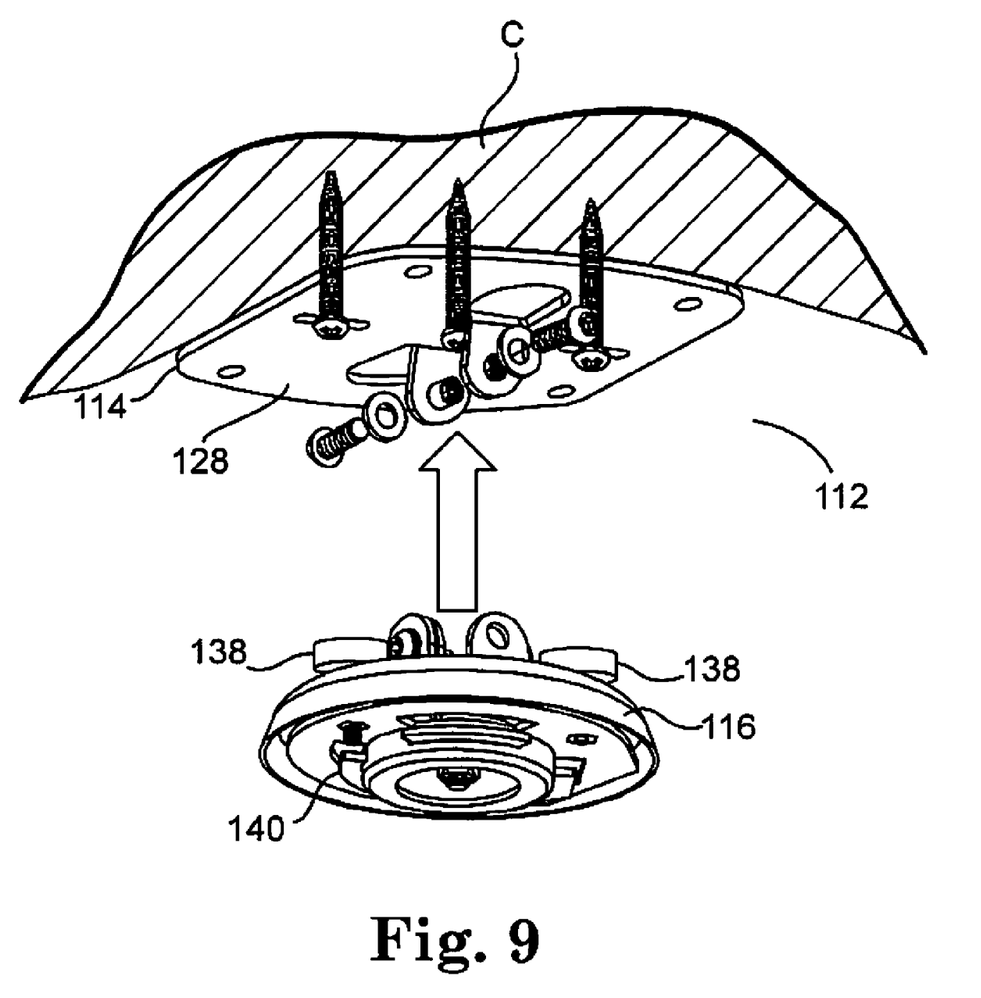
FIG. 9 is a perspective view of FIG. 8 with the middle column removed, and in the process of attachment to the ceiling.

FIG. 8 is a perspective view that shows the disassembly of a ceiling assembly 112 into an upper section 114, a middle section 118, and a lower section 116. In FIG. 8, removal of the middle section 118 of the ceiling assembly 112 creates a more compact connection to the ceiling or wall surface. FIG. 8 is an exploded view that shows a ceiling assembly 112 having upper 114 and lower sections 116 before the extendable and retractable middle (or column) section 118 has been removed from the ceiling assembly 112. In FIG. 8, the ceiling assembly 112 (with the middle section removed) connects to the ceiling 111 with the ceiling plate 128 in a compact profile when needed, and the jointed articulated legs 30 (not shown in this figure) function in the same manner connecting the mounting bracket 20 (not shown in this figure) and the projector 1 (not shown in this figure) as previously described.

Figure 2:
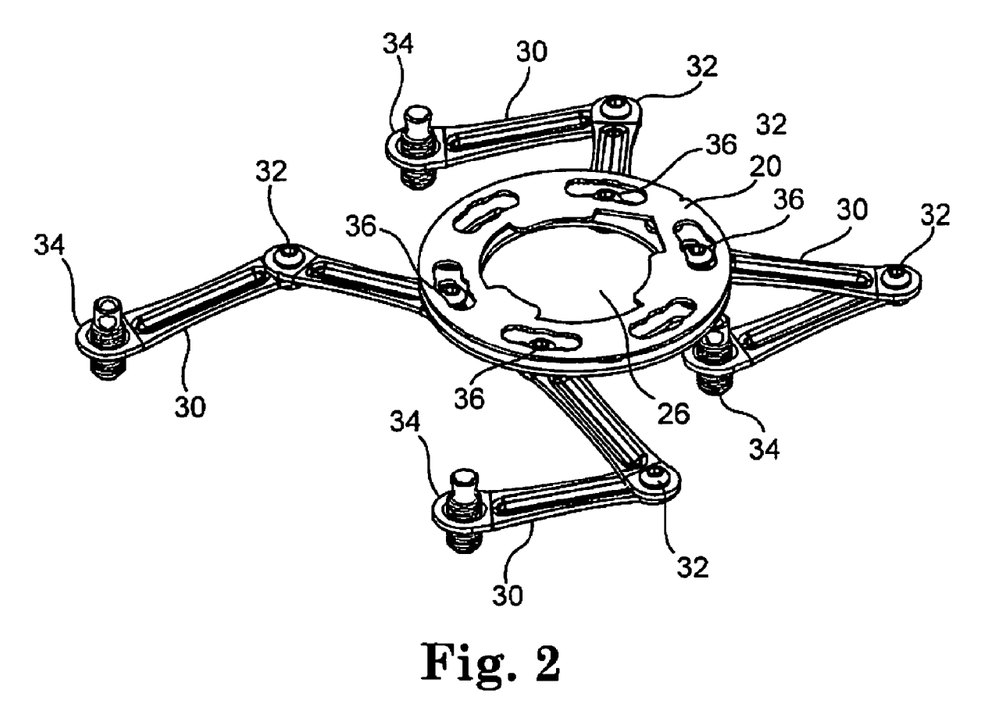
FIG. 2 is a perspective view of a mounting bracket according to the present invention.

FIG. 2 is a perspective view of a mounting bracket 20 connected to four jointed articulated legs 30 according to the present invention. The jointed articulated legs 30 of the present invention offer a wide range of motion. The proximal end 36 of the jointed articulated legs 30 are connected to the mounting bracket 20. The jointed articulated legs include at least a pair (thought they could be 2 or more) separate leg elements, rotatably joined together end to end to form leg units (leg units and legs are terms used interchangeably in this document). Each leg element has a first and second end and are joined end-to-end. In the preferred embodiment they are have apertures at their ends and are joined together by pivots 32, such as bolts or rivets or similar. The proximal end 36 of the jointed articulated legs can slide within the slots 24 of the mounting bracket 20 to permit adjustments for mounting and aligning, and can be secured in place as needed for securing the projector. The jointed articulated legs 30 pivot around pivot points 32, and securely connect at the distal ends 34 to the base of the projector 1. See FIG. 1.

In FIG. 1, the jointed articulated legs are connected with screws 31, however, as mentioned, other methods of attachment are possible and encompassed by the invention. The proximal end 36 of the jointed articulated legs 30 can be connected by a system of thumbscrews, pins, or notches making it easier to adjust or remove the projector. The user can also bolt or screw the two parts together. While four jointed articulated legs 30 are shown as a preferred embodiment of the invention, a plurality of jointed articulated legs are possible, such as two, three, and five legs, consistent with the scope of the invention.

The jointed articulated legs 30 of the invention allow routing of the legs 30 around critical ventilation screens on the base of the projector 1. In FIG. 1, ventilation screen 33 is shown, and the jointed articulated legs 30 are positioned (above for placement) around the ventilation screen 33. Thus, in addition, to securely connecting different projectors, the jointed articulated legs 30 of the invention can accommodate the flow of ventilation by avoiding blockage of all or most of the ventilation screens 33 on the projector 1.

Figure 10:
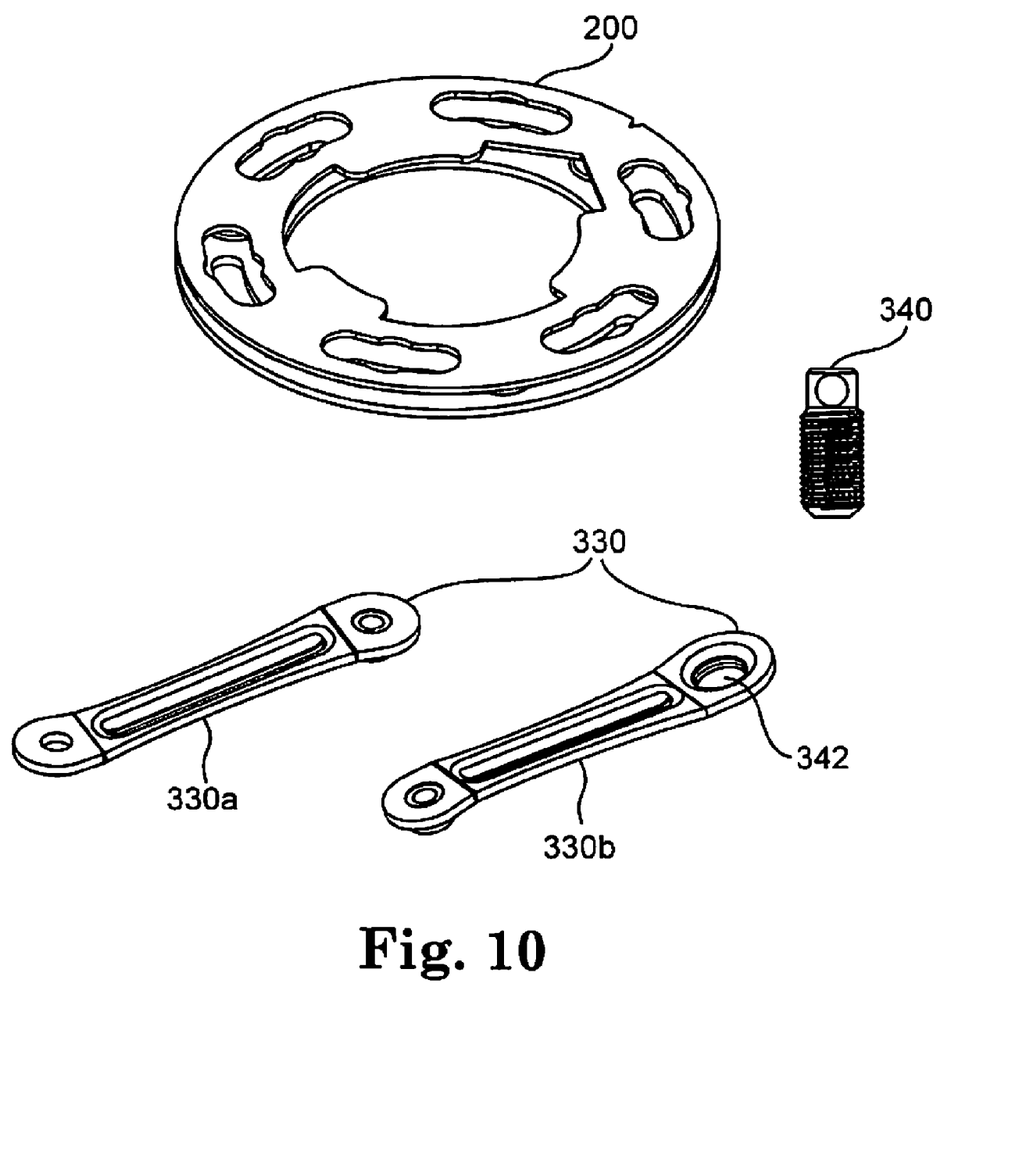
FIG. 10 is a perspective view of a mounting bracket, separate legs of the articulated legs, and a side view of a threaded leveling barrel.

FIG. 10 shows a mounting bracket 200, a offset articulated leg 330 disconnected into two separate legs, a proximal end leg, 330a and a distal end leg 330b having a threaded leveling barrel opening 342, and a threaded leveling barrel 340 of the invention. The proximal and distal legs 330a and 330b can be used in combination with the offset articulated legs 330 in securing the projector 1. This permits greater functionality of the legs.

Figure 11:
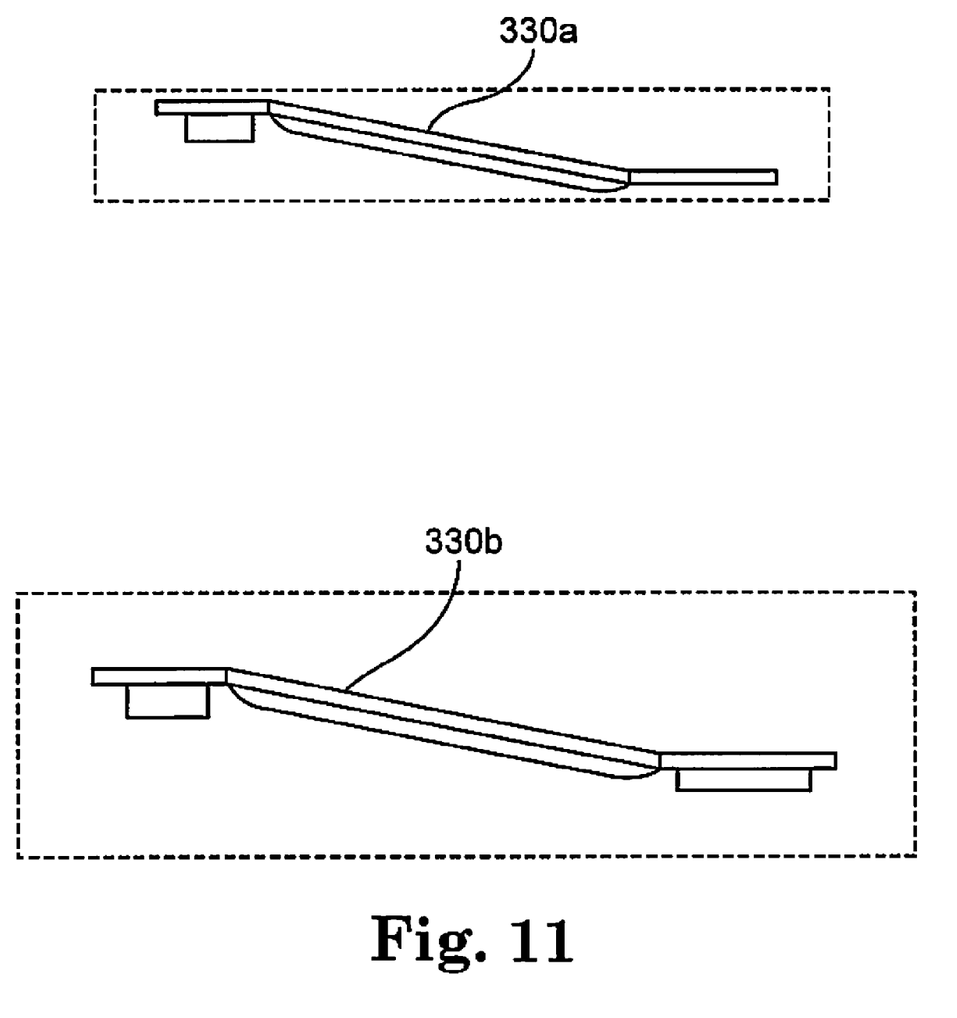
FIG. 11 is a side plan view of the separate legs of the articulated legs.

FIG. 11 shows side plan views of the proximal end leg, 330a and distal end leg 330b of a pair of offset articulated legs 330 having a threaded leveling barrel opening 342 (not shown). As shown in the side plan view, the proximal end leg 330a and distal end leg 330b are offset or at an angle and not in the same plane. In a preferred embodiment of the invention, the jointed articulated legs have planar end portions which may be in parallel but not identical planes, and a diagonal link portion between the ends which connects the ends. The offset feature of the offset articulated legs allows for a greater range of motion than legs that are substantially parallel to each other. For example, the range of motion of the distal end leg is about 360°. This allows the user to connect to the projector in a variety of different configurations, such as in avoiding ventilation screens.

In a preferred embodiment (not shown), the user can employ 1 or more single distal legs 30b with articulated legs 30, and still use the threaded leveling barrels 40. The purpose of the threaded leveling barrels for aligning the projector and mount is described below In FIG. 12, the threaded leveling barrel 240 is shown in side views and dissected along lines 12b-12b and 12a-12a to provide two cross section views. The threaded leveling barrel 240 has thread on the outside that is complementary to the threaded leveling barrel opening 342 on the distal end 334 of the offset articulated leg 330 (not shown in this figure). See FIG. 1. The threaded leveling barrel 240 can be adjusted up or down within the threaded leveling barrel openings 342 (not shown).

Figure 12:
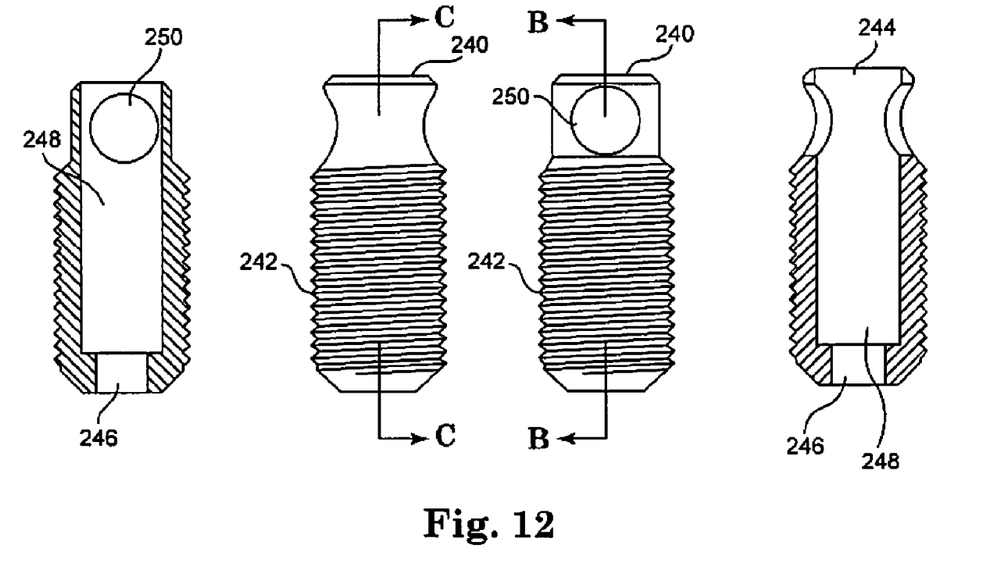
FIG. 12 shows cross sections of a threaded leveling barrel.

In FIG. 12, the threaded leveling barrels 240 have a top orifice 244, a bottom orifice 246, a hollow center orifice 248 wherein the mounting screw is inserted, and side (or radial) orifices 250. Side orifices are intended for a tool such as a bar to pass therethrough and permit twisting thereof. Remember, that these outer threaded elements (barrels) 240 have no "head" for turning because they are hollowed out to permit the inner fastener (see S4-6 in FIG. 5) to be accesses for tightening. The top orifice 244 must be large enough to permit a screw 31 (not shown in this figure) having a screw head 245 (not shown in this figure), such as a Phillips head screw, to be placed in the threaded leveling barrel 40, the screw head 245 should drop to the bottom orifice 246. The bottom orifice 246 of the threaded leveling barrel 240 must be smaller than the head diameter of the screw so the screw head fits within the hollow center orifice, and the screw falls to the bottom orifice 246.

The body (or screw portion) of the screw should protrude out the bottom orifice 244 (not shown in this figure), and allow the user to securely connect the threaded leveling barrels 240 to the projector to the by tightening the screws 31 inside the hollow center orifice. The side orifices 250 of the threaded leveling barrels 240 should be wide enough to permit a tool (not shown in this figure), such as a wrench or bar, if needed, to fit through the side orifices 250, and the user can adjust or align the projector, and then the internal screw can be tightened In FIG. 5 is shown a preferred embodiment of the screws 31 that fit within the hollow center orifice 248 (not shown in this figure) of the threaded leveling barrels 240. The screws 31 that connect the jointed articulated legs to the projector 1 (not shown in this figure) can be one of many different size screws (shown as M6×12 identified as S6 in the figure, M5×12 identified as S5 in the figure, and M4×12 identified as S4 in the figure). In this embodiment, each size screw has a screw head 245 with a depression of about same size and shape (not shown in the figure).

In a preferred embodiment, the depression in the screw heads is shaped to permit the same security Allen wrench to tighten any of the different sized screws, and secure the projector. This is convenient and useful feature for a universal projector mount kit. When the same allen wrench can connect the threaded leveling barrel to a variety of projectors without regard to screw size, that provides greater flexibility and efficiency for the user.

An embodiment of the present invention includes a mounting and leveling kit for connecting a projector to a mounting surface. This embodiment includes: a ceiling component having upper and lower sections; the upper section of the ceiling component connects to the mounting surface; a mounting bracket having top and bottom portions; the lower section of the ceiling component connects to the top portion of the mounting bracket; a plurality of offset articulated legs, each offset articulated leg having a proximal end and a distal end with a threaded leveling barrel opening; threaded leveling barrels having a top orifice, a bottom orifice, and a hollow center orifice, the threaded leveling barrels threads into the threaded leveling barrel openings of the offset articulated legs; a plurality of different size screws having screw heads with the same size and shape depression for an allen wrench to snuggly fit into the depression, and permit the user to tighten the screw, the screw heads are sized to fit inside the hollow center orifice of the threaded leveling barrels; and at least one size screw from the plurality of screws fitting inside the hollow center orifice of the threaded leveling barrels connects the threaded leveling barrel to the projector.

Figure 13:
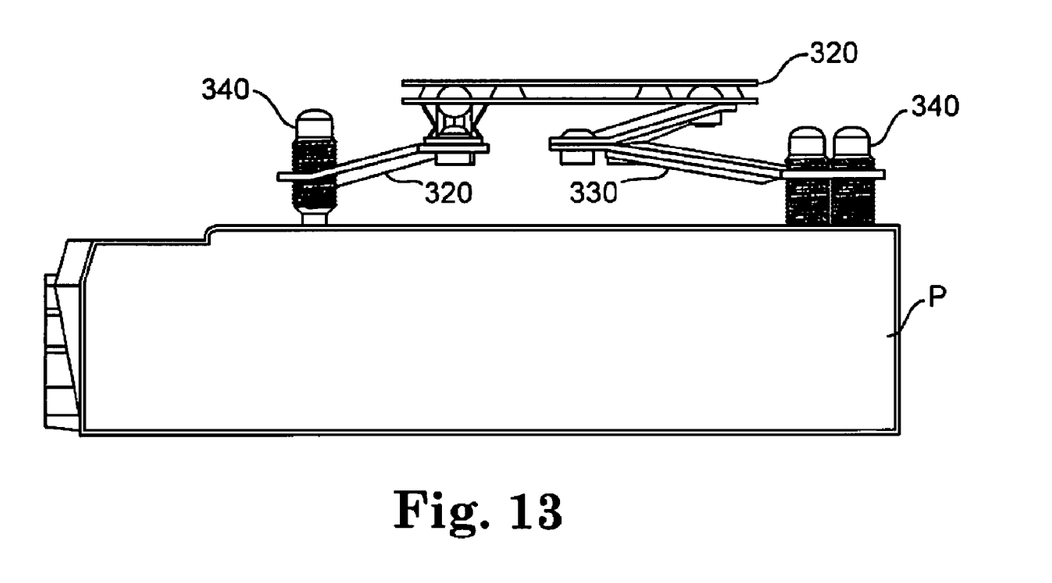
FIG. 13 is a schematic side plan view of a mounting bracket connected to a projector.

FIG. 13 shows a mounting bracket 320 connected by offset articulated legs 330 and threaded leveling barrels 340 to the projector 1. Another embodiment of the invention shows the mounting bracket having top and bottom portions that connect to a lower section of a ceiling assembly, and a plurality of offset articulated legs, each leg having a proximal end and a distal end with a threaded leveling barrel opening; and threaded leveling barrels, wherein the offset articulated legs connect to the mounting bracket at the proximal end, and the offset articulated legs connect at the distal ends to a projector with the threaded leveling barrels.

A preferred embodiment of the invention is a threaded leveling barrel that has a hollow center orifice, a top orifice that permits a screw to be placed inside the hollow center orifice, a bottom orifice that is smaller than the screw head, and side orifices. The screw head portion should fit snuggly against the bottom orifice, and permit the screw body to secure the threaded leveling barrel to the projector when the screw is tightened inside the hollow center orifice. The top, bottom, and center orifices permit the user to secure the screws in the hollow center orifice, and connect the offset articulated legs to the projector. When the projector is secured to the offset articulated legs and mounting bracket, the user can adjust each threaded leveling barrel, and easily align the projector.

While embodiments were described using screws, the connections for the threaded leveling barrels to the projector are not limited to just screws. The threaded leveling barrels can be connected to the projector using a variety of different connectors within the hollow center orifice without detracting from the leveling and aligning function. However the connectors must be able to secure the threaded barrels to the projector.

Having thus described the invention, it should be apparent that numerous modifications and adaptations may be resorted to without departing from the scope and fair meaning of the instant invention as set forth herein above and as described herein below by the claims.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts, and drawings, and all the steps in any method or process disclosed may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. section 112.

A method of attaching disparate equipment to a mounting surface is also disclosed herein. Because various forms of equipment having a unpredictably spaced mounting anchor points thereon, it is necessary to be able to adjust for the unpredictability. The method may include, mounting a bracket on the mounting surface, identifying the necessary anchor points (they may not all be needed) on the equipment capable of supporting same from the bracket (determined by the brand and type of equipment) and, in any order; linking the anchor points and the bracket with a plurality multi-segment articulable arms by fixing one end of the arms on the bracket, then adjusting the articulation of the arms so that the arms are attachable to the anchor points and fixing the other end of the arms to the anchor points.

The method of also provides leveling the equipment by providing adjustment between each anchor point and the link arms, so that the equipment can be leveled without adjusting the orientation of the bracket and adjustment capability within the anchorage itself.

The method also provides adjusting the anchorage to the equipment by turning an outer threaded element, and adjusting the level by turning a threaded element within the outer element.

The invention claimed is:

1. A mounting and leveling system connecting equipment to a mounting surface, comprising:
   a) a component having upper and lower sections;
   b) the upper section of the component connecting to the mounting surface;
   a plurality of jointed articulated leg units each having a proximal and distal ends, each unit including at least two leg elements pivotally joined end-to-end; said units being joined to said component at their proximal end and to said equipment at said distal end; to provide an articulatable connection between the equipment and said mounting system and, wherein said distal end of said leg units including an aperture; and
   c) a plurality of threaded leveling barrels having a top orifice, a bottom orifice, and a hollow center orifice, the threaded leveling barrel threads into aperture in said leg units; and
   d) an adjustment screw having a screw head sized to fit inside the hollow center orifice of the threaded leveling barrels, and each screw having a shaft sized to be received through said bottom orifice, the screw connecting the threaded leveling barrels to the projector;
   so that the equipment can be leveled as desired.

2. The system of claim 1 wherein the leveling barrels include a side orifice therethrough sized to permit insertion of a turning tool.

3. The system of claim 1 wherein both of said leg elements includes first and second end portions, being in substantially parallel but offset planes; so that when said elements are joined and pivoted relative to each other as a unit, each element will have 360 degree freedom of rotation.

4. The system of claim 1 wherein each of each of said leg elements includes first and second end portions includes a longitudinal depression between said end portions, so that said leg elements are resistant to bending.

5. A mounting and leveling kit for connecting equipment to a mounting surface, comprising:

a) a mounting bracket having upper and lower sections;
b) the upper section of the bracket connectable to the mounting surface;
c) a plurality of mounting legs having a proximal end and a distal end with a threaded leveling barrel opening, the proximal end being connected to the mounting bracket;
d) a threaded leveling barrel having a top orifice, a bottom orifice, and a hollow center orifice, the threaded leveling barrel threads into the threaded leveling barrel opening of the jointed articulated legs; and
e) a plurality of screws having screw heads sized to fit inside the hollow center orifice and snuggly against the bottom orifice of the threaded leveling barrels, and each screw having a shaft sized to be received through said bottom orifice, the screws securely connecting the threaded leveling barrels to the equipment.

* * * * *